United States Patent
Onozawa et al.

(10) Patent No.: US 12,204,020 B2
(45) Date of Patent: Jan. 21, 2025

(54) OBJECT DETECTION DEVICE

(71) Applicants: DENSO CORPORATION, Kariya (JP); TOYOTA JIDOSHA KABUSHIKI KAISHA, Toyota (JP)

(72) Inventors: Masato Onozawa, Kariya (JP); Hiroki Hori, Kariya (JP); Koji Takeuchi, Toyota (JP); Iwao Izumikawa, Toyota (JP); Hiroki Shimazu, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 17/660,919

(22) Filed: Apr. 27, 2022

(65) Prior Publication Data
US 2022/0252719 A1 Aug. 11, 2022

Related U.S. Application Data (63) Continuation of application No. PCT/JP2020/040006, filed on Oct. 23, 2020.

(30) Foreign Application Priority Data

Oct. 31, 2019 (JP) ................. 2019-198744

(51) Int. Cl.
*G01S 13/92* (2006.01)
*G01S 7/40* (2006.01)
*G01S 13/931* (2020.01)

(52) U.S. Cl.
CPC .............. *G01S 13/92* (2013.01); *G01S 7/403* (2021.05); *G01S 2013/9327* (2020.01)

(58) Field of Classification Search
CPC ... G01S 13/92; G01S 7/403; G01S 2013/9327
See application file for complete search history.

(56) References Cited

U.S. PATENT DOCUMENTS

| 6,763,318 B1* | 7/2004 | Winter .................. G01S 13/931 |
| | | 702/158 |
| 2018/0120416 A1* | 5/2018 | Kitamura ................ G01S 7/415 |
| 2018/0156909 A1* | 6/2018 | Kitamura .............. G01S 7/4026 |

FOREIGN PATENT DOCUMENTS

| JP | 2016-156725 A | 9/2016 |
| JP | 6358076 B2 | 7/2018 |

* cited by examiner

*Primary Examiner* — Peter M Bythrow
*Assistant Examiner* — Nazra Nur Waheed
(74) *Attorney, Agent, or Firm* — Maschoff Brennan (57) ABSTRACT

An object detection apparatus is mounted to a vehicle and detects an object by a reflected wave of a probe wave. The object detection apparatus calculates a relative velocity of the object to the vehicle, estimates an azimuth of the object relative to the vehicle, and corrects the estimated azimuth. The object detection apparatus generates a velocity-azimuth curve that indicates a relationship between the relative velocity of the object and the azimuth of the object that is calculated based on a theoretical mounting angle of the object detection apparatus, supplies a weight to an azimuth error that is an error between the velocity-azimuth curve and the estimated azimuth, based on the estimated azimuth, and calculates a correction value of the estimated azimuth by calculating, as an actual mounting angle deviation of the object detection apparatus, a weighted average value of the azimuth error to which the weight is supplied.

4 Claims, 4 Drawing Sheets

$$\theta_{dw} = \frac{\sum_{k=0}^{N}((\theta i_k - \theta o_k) * W_k)}{\sum_{k=0}^{N} W_k} \quad (3)$$

OBJECT DETECTION DEVICE

CROSS-REFERENCE TO RELATED APPLICATION

The present application is a continuation application of International Application No. PCT/JP2020/040006, filed on Oct. 23, 2020, which claims priority to Japanese Patent Application No. 2019-198744, filed on Oct. 31, 2019. The contents of these applications are incorporated herein by reference in their entirety.

BACKGROUND

Technical Field

The present disclosure relates to an object detection apparatus.

Related Art

An object detection apparatus such as an onboard radar apparatus is known. The object detection apparatus may be mounted to a vehicle and detect an object by a reflected wave of a probe wave.

SUMMARY

One aspect of the present disclosure provides an object detection apparatus that is mounted to a vehicle and detects an object by a reflected wave of a probe wave. The object detection apparatus calculates a relative velocity of the object to the vehicle, estimates an azimuth of the object relative to the vehicle, and corrects the estimated azimuth. The object detection apparatus generates a velocity-azimuth curve that indicates a relationship between the relative velocity of the object and the azimuth of the object that is calculated based on a theoretical mounting angle of the object detection apparatus, supplies a weight to an azimuth error that is an error between the velocity-azimuth curve and the estimated azimuth, based on the estimated azimuth, and calculates a correction value of the estimated azimuth by calculating, as an actual mounting angle deviation of the object detection apparatus, a weighted average value of the azimuth error to which the weight is supplied.

DESCRIPTION OF THE EMBODIMENTS

The following embodiments of the present disclosure relate to an object detection apparatus that is mounted to a vehicle and detects an object by a reflected wave of a probe wave.

As described in Japanese Patent Publication No. 6358076, in a case in which an object detection apparatus, such as an onboard radar apparatus, that detects an object by a reflected wave of a probe wave is mounted to a bumper of a vehicle, detection performance regarding an azimuth at which the object is present is known to decrease as a result of deviation of a mounting angle of the object detection apparatus (deviation from a theoretical mounting angle of the object detection apparatus). To improve detection accuracy regarding the azimuth of the object, an azimuth error that is a detection error of the azimuth of the object that is attributed to the deviation of the mounting angle is preferably calculated.

In Japanese Patent Publication No. 6358076, the azimuth error is calculated by a comparison of a velocity-azimuth curve and an observation point, the velocity-azimuth curve being calculated based on the theoretical mounting angle of the object detection apparatus regarding a relationship between a relative velocity of the object relative to an own vehicle and the azimuth of the object. Then, an actual mounting angle is calculated from the azimuth error and the detected azimuth of the object is corrected.

When a vehicle velocity error that is an error in a velocity of the own vehicle is present, the velocity-azimuth curve in Japanese Patent Publication No. 6358076 becomes a velocity-azimuth curve that includes the vehicle velocity error and deviation occurs. Consequently, calculation accuracy regarding the azimuth error and the mounting angle may decrease, and further, calculation accuracy regarding the detected azimuth of the object may decrease.

It is thus desired to provide a technology that enables an azimuth of an object to be accuracy detected in an object detection apparatus, even when a vehicle velocity error is present.

An exemplary embodiment of the present disclosure provides an object detection apparatus that is mounted to a vehicle and detects an object by a reflected wave of a probe wave. The object detection apparatus includes: a velocity calculating unit that calculates a relative velocity of the object to the vehicle; an azimuth estimating unit that estimates an azimuth of the object relative to the vehicle; and an azimuth correcting unit that corrects the azimuth of the object relative to the vehicle that is estimated by the azimuth estimating unit.

The azimuth correcting unit includes: a velocity-azimuth curve generating unit that generates a velocity-azimuth curve that indicates a relationship between the relative velocity of the object and the azimuth of the object that is calculated based on a theoretical mounting angle of the object detection apparatus; a weighting unit that supplies a weight to an azimuth error that is an error between the velocity-azimuth curve and the estimated azimuth, based on the azimuth that is estimated by the azimuth estimating unit; and a correction value calculating unit that calculates a correction value of the estimated azimuth by calculating, as an actual mounting angle deviation of the object detection apparatus, a weighted average value of the azimuth error to which the weight is supplied by the weighting unit.

As a result of keen research, the present disclosures have obtained knowledge that a deviation amount that occurs in the velocity-azimuth curve as a result of a vehicle velocity error changes based on the azimuth of the object relative to the vehicle. Based on this knowledge, the object detection apparatus related to the present disclosure first estimates the azimuth of the object relative to the vehicle by the azimuth estimating unit. Then, the weighted average of the azimuth error to which the weight is supplied based on the estimated azimuth is calculated as the mounting angle deviation and the correction value of the azimuth is calculated by the azimuth correcting unit. Therefore, the mounting angle deviation of the object detection apparatus can be mitigated taking into consideration the deviation amount that occurs in the velocity-azimuth curve as a result of the vehicle velocity error. Consequently, the azimuth of the object can be accurately detected even when the vehicle velocity error is present.

Figure 1:
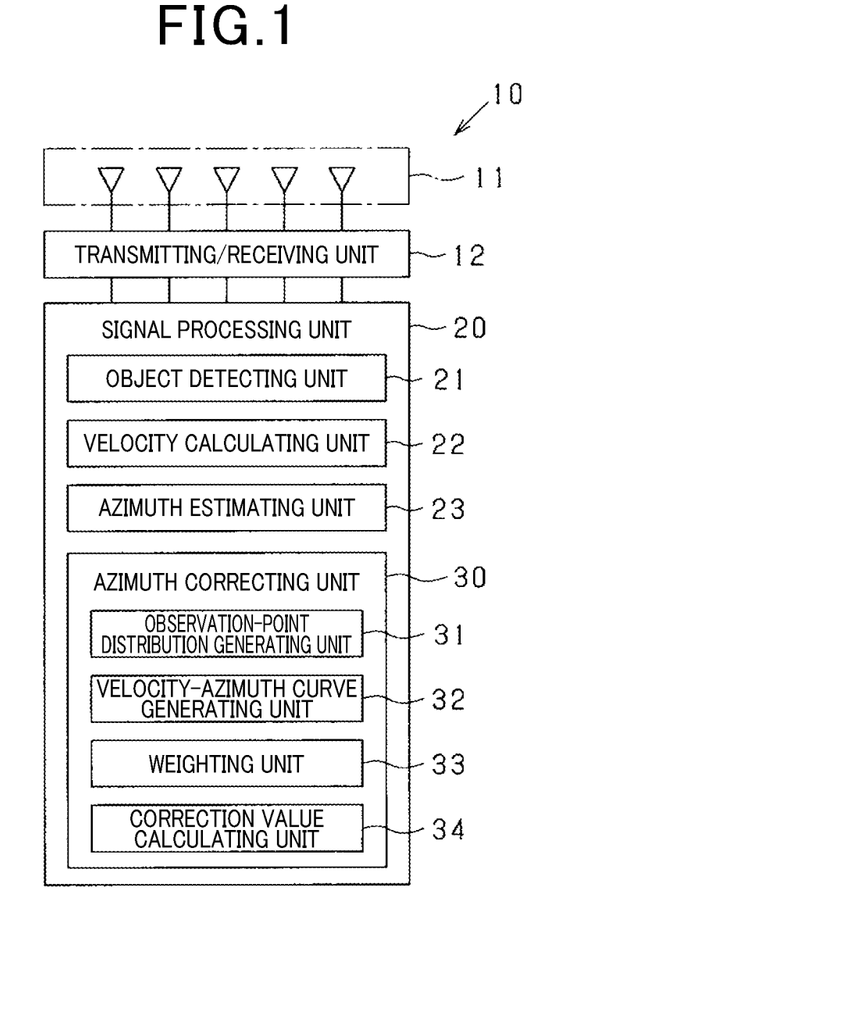
FIG. 1 is a block diagram illustrating a configuration of an object detection apparatus.
Figure 2:
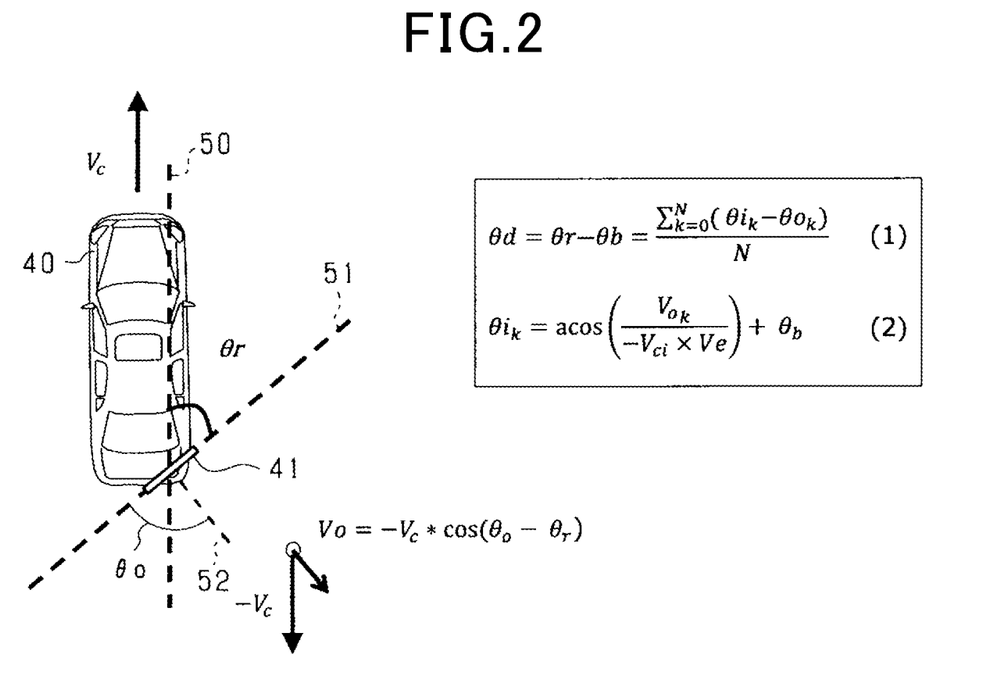
FIG. 2 is a diagram for explaining a position in which the object detection apparatus is set, and a relative position and an azimuth of an object.

An object detection apparatus 10 shown in FIG. 1 is an apparatus for detecting an object by a reflected wave of a probe wave. As shown in FIG. 2, for example, the object detection apparatus 10 may be mounted to an own vehicle 40 by being mounted to a rear bumper 41 or the like of the own vehicle 40. The rear bumper 41 is composed of a material that transmits electromagnetic waves, such as radar waves. The object detection apparatus 10 is set near a right end within the rear bumper 41.

The object detection apparatus 10 includes an antenna unit 11, a transmitting/receiving unit 12, and a signal processing unit 20. The object detection apparatus 10 is communicably connected to other apparatuses that are mounted to the vehicle by an onboard local area network (LAN) (not shown).

The antenna unit 11 includes a plurality of antennas that are arrayed in a single row in a horizontal direction. The antenna unit 11 transmits and receives radar waves that are composed of multifrequency continuous waves (CW).

The transmitting/receiving unit 12 periodically transmits and receives the radar waves as probe waves at a fixed time interval, through the antenna unit 11. In addition, for every reception signal that is received by the antennas that configure the antenna unit 11, the transmitting/receiving unit 12 generates a beat signal that is composed of a frequency component that is a difference between the reception signal and a transmission signal, and supplies reception data that is the beat signal to which analog-to-digital (A/D) conversion is performed to the signal processing unit 20. Here, the multifrequency CW is composed of a plurality of continuous waves that are of the order of GHz and of which frequencies differ by about 1 MHz.

The signal processing unit 20 is a known microcomputer that is mainly configured by a central processing unit (CPU), a read-only memory (ROM), and a random access memory (RAM). The signal processing unit 20 detects an object that reflects the radar wave and performs at least a main process for generating information related to the object based on a program that is stored in the ROM. Here, a portion of the RAM is configured by a non-volatile memory in which contents of the memory are held even when power of the object detection apparatus 10 is turned off. The non-volatile memory stores therein an azimuth correction table that indicates a corresponding relationship between a relative velocity to an object (here, a frequency bin that is obtained by frequency analysis) and an azimuth error at this relative velocity.

The signal processing unit 20 includes an object detecting unit 21, a velocity calculating unit 22, an azimuth estimating unit 23, and an azimuth correcting unit 30.

For example, the object detecting unit 21 can acquire a reflected wave of a radar wave that is received by the transmitting/receiving unit 12 and detect an object by analyzing the reflected wave.

When the object is detected, the velocity calculating unit 22 calculates a relative velocity of the detected object relative to the own vehicle 40. For example, the relative velocity can be calculated from the reflected wave of the radar wave that is received by the transmitting/receiving unit 12. More specifically, the relative velocity of the object to the own vehicle 40 can be calculated by a frequency of the reflected wave of the radar wave that is reflected by the object that changes as a result of the Doppler effect.

When the object is detected, the azimuth estimating unit 23 estimates an azimuth of the detected object relative to the own vehicle 40. For example, the azimuth of the object can be calculated by a phase difference of the reflected wave of the radar wave that is received by the plurality of antennas in the transmitting/receiving unit 12. Here, a distance between the own vehicle 40 and the object can be calculated by a transmission time of the radar wave and a reception time of the reflected wave. In addition, if the position and the azimuth of the object are calculated, a relative position of the object to the own vehicle 40 can be identified.

The azimuth correcting unit 30 corrects the azimuth (referred to, hereafter, as an estimated azimuth) of the object to the own vehicle 40 that is estimated by the azimuth estimating unit 23. The azimuth correcting unit 30 includes an observation-point distribution generating unit 31, a velocity-azimuth curve generating unit 32, a weighting unit 33, and a correction value calculating unit 34.

Figure 3:
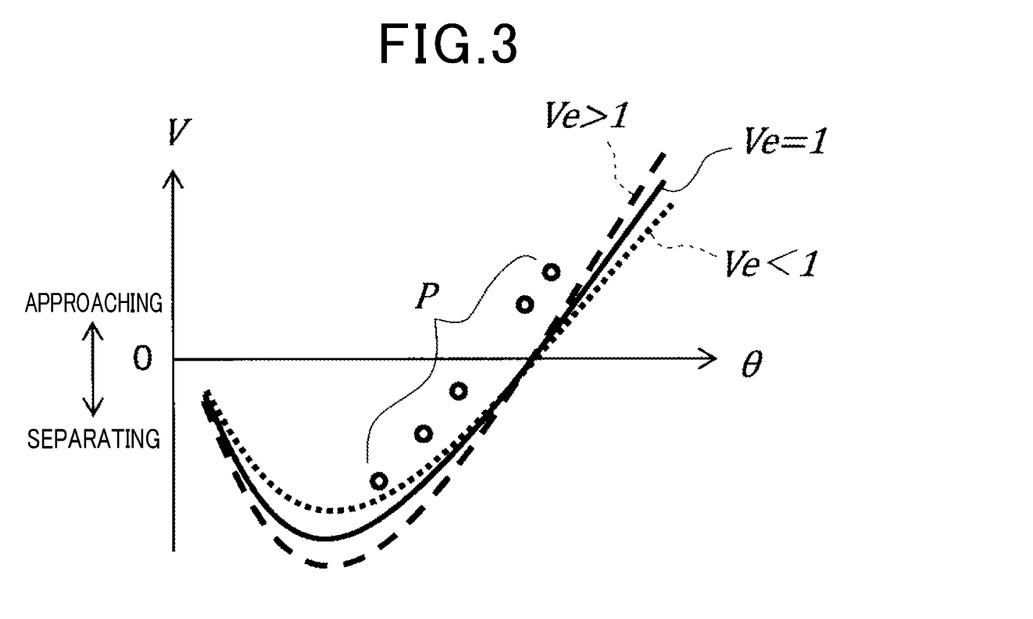
FIG. 3 is a diagram illustrating a relationship between an observation point and a velocity-azimuth curve.

When the object detecting unit 21 detects an object, the observation-point distribution generating unit 31 generates object information for the detected object that includes at least the relative velocity that is calculated by the velocity calculating unit 22 and the azimuth that is estimated by the azimuth estimating unit 23, and generates an observation point distribution P shown in FIG. 3. The observation point distribution P includes an N number of observation points for the object. A relative velocity Vok and an estimated azimuth θok of the object are associated with a kth observation point (k=1, ..., N).

The velocity-azimuth curve generating unit 32 acquires a relative velocity Vo of the object that is calculated by the velocity calculating unit 22 and a vehicle velocity Vc and generates a velocity-azimuth curve C. For example, as the vehicle velocity Vc, a detection value of a vehicle velocity sensor can be acquired. When a stationary object such as a wall surface is present on a righthand side of the own vehicle 40, the reflected wave can be acquired from various points on the wall surface. In addition, an azimuth at which the observation point on the wall surface is present and a relative velocity that is detected for the observation point have a relationship that is expressed by the velocity-azimuth curve C.

As shown in FIG. 2, a case in which the object detection apparatus 10 is mounted to a vehicle in a direction indicated by a broken line 51 that is tilted by a mounting angle θr [deg] to the right when viewed from above the own vehicle 40, relative to a front/rear direction of the vehicle 40 indicated by a broken line 50 is described as an example. When the object that reflects the radar wave is a stationary object, a corresponding relationship that is expressed in expression (2) below that is also shown in FIG. 2 is present between the relative velocity of a stationary object to the side and the azimuth at which the stationary object is present. In addition, a mounting angle deviation Od of the object detection apparatus 10 can be calculated by expression (1) below that is also described in FIG. 2.

$$\theta d = \theta r - \theta b = \frac{\sum_{k=0}^{N}(\theta ik - \theta ok)}{N} \qquad (1)$$

$$\theta ik = a\cos\left(\frac{Vok}{-Vci \times Ve}\right) + \theta b \qquad (2)$$

Here, θr is an actual mounting angle of the object detection apparatus 10. θb is a theoretical mounting angle (a mounting angle when a deviation in angle is not present). θik is an azimuth at the kth observation point of the object that is calculated based on θb. θok is an azimuth (that is, an estimated azimuth) that is observed at the kth observation point of the object. Vci is a true vehicle velocity of the own vehicle 40. Vok is a relative velocity at the kth observation point of the object. Ve is a velocity error (error in Vc). N is a total number of observation points of the object. Units of θd, θr, θik, θok, and θb are all radian (rad). Here, the detected vehicle velocity Vc of the own vehicle 40 can be expressed by Vc=Vci×Ve.

The velocity-azimuth curve generating unit 32 generates the velocity-azimuth curve C based on expression (2) above that is also shown in FIG. 2. That is, the velocity-azimuth curve C is a curve that indicates the relationship between the relative velocity Vo of the object and the azimuth θi of the object that are calculated based on a theoretical mounting angle θb of the object detection apparatus 10.

When a range of laser probe in the object detection apparatus 10 is 0 to 180 [deg], a probe range is a range that is behind the broken line 51 relative to the own vehicle (a range on a lower side in FIG. 2). A broken line 52 indicates an estimated azimuth θo that is an azimuth of the detected object. The estimated azimuth θo corresponds to an angle that is formed by the broken line 51 and the broken line 52. When a probe range that is below and to the left of the broken line 51 in FIG. 2 is 0 [deg] and a probe range that is above and to the right is 180 [deg], a directly lateral direction to the own vehicle 40 (a rightward direction to the own vehicle 40 that is orthogonal to the vehicle velocity Vc) is 90+θr [deg].

As shown in FIG. 2, the relative velocity Vo of the detected object can be expressed by Vo=-Vc×cos (θo-θr). When a point that is directly lateral to a position in which the object detection apparatus 10 is mounted is an observation point, because θo=90+θr [deg], the relative velocity Vo at this observation point is 0. That is, the azimuth at an intersection between the velocity-azimuth curve C shown in FIG. 3 and an azimuth axis (θ axis) is 90+θr [deg]. The relative velocity Vo of an observation point that is positioned further toward an advancing direction side of the own vehicle 40 than the directly lateral observation point is a positive value that indicates moving toward the own vehicle 40. In addition, the relative velocity Vo of an observation point that is positioned further toward a side opposite the advancing direction of the own vehicle 40 than the directly lateral observation point is a negative value that indicates moving away from the own vehicle 40.

That is, when θ>90+θr [deg], the relative velocity Vo is Vo>0. When θ<90+θr [deg], the relative velocity Vo is Vo<0. In addition, when a direction that is directly behind the own vehicle 40 is an observation point, because θ=θr, the velocity-azimuth curve C becomes a local minimum value and the relative velocity Vo=-Vc. That is, the velocity-azimuth curve C has a linearly symmetrical shape at the azimuth θr that is the direction directly behind the own vehicle.

As shown in FIG. 3, the velocity-azimuth curve C changes based on a value of a vehicle velocity error Ve. In FIG. 3, the velocity-azimuth curve C that is shown by a solid line shows the velocity-azimuth curve when the vehicle velocity error Ve is 1 (Ve=1). The velocity-azimuth curve C that is shown by a broken line shows the velocity-azimuth curve when the vehicle velocity error Ve is greater than 1 (Ve>1). In contrast to when Ve=1, when Ve>1, the velocity-azimuth curve C has a smaller rate of change of the relative velocity Vo relative to the azimuth θ. In addition, in both of when Ve>1 and when Ve<1, a deviation amount of the velocity-azimuth curve C increases as the relative velocity Vo becomes farther from zero.

As shown in FIG. 3, the azimuth error at each observation point is expressed by a difference (θik-θok) in the azimuth-axis direction (left/right direction in FIG. 3) between the velocity-azimuth curve C and each point that is included in the observation point distribution P. Through expression (1) above, the mounting angle deviation θd can be calculated by a total average of the azimuth error at each observation point being calculated. It can be understood that, when the velocity-azimuth curve C is deviated as a result of the vehicle velocity error Ve, the azimuth error is also deviated, and the mounting angle deviation θd that is calculated by expression (1) above is also deviated as well.

In comparison to the velocity-azimuth curve when Ve=1, when Ve>1, the velocity-azimuth curve is deviated toward a direction that is closer to the observation point distribution P side as the relative velocity becomes faster toward an approaching side, and the velocity-azimuth curve is deviated toward a direction that is farther from the observation point distribution P side as the relative velocity becomes faster toward a separating side. Therefore, when Ve>1, the azimuth error is calculated to be smaller as the relative velocity becomes faster toward the approaching side, and the azimuth error is calculated to be greater as the relative velocity becomes faster toward the separating side.

In contrast, when Ve<1, the velocity-azimuth curve is deviated toward a direction that is farther from the observation point distribution side when the relative velocity becomes faster toward the approaching side, and the velocity-azimuth curve is deviated in a direction that is closer to the observation point distribution P side as the relative velocity becomes faster toward the separating side. Therefore, when Ve<1, the azimuth error is calculated to be greater as the relative velocity becomes faster toward the approaching side, and the azimuth error is calculated to be smaller as the relative velocity becomes faster toward the separating side. In both of when Ve>1 and Ve<1, the deviation amount of the azimuth error increases as the relative velocity becomes farther from zero, and error in a calculation value of the mounting angle deviation θd increases.

Meanwhile, in a CW radar, in theory, an object of which the relative velocity Vo is zero cannot be measured, and measurement accuracy when the relative velocity Vo is near zero is also low. Therefore, at the relative velocity Vo at which the deviation amount of the velocity-azimuth curve C is almost zero, accurate measurement of the object is difficult. Correction of the deviation in the azimuth angle based on the deviation in the velocity-azimuth curve C is desired.

Therefore, in the weighting unit 33, in both of when Ve>1 and Ve<1, based on knowledge that the deviation amount of the azimuth error (θik-θok) increases as the azimuth θ becomes farther from 90+θr [deg], weight is supplied based on the estimated azimuth θok that is estimated by the azimuth estimating unit 23.

For example, the weighting unit 33 may set the weight to be smaller as the deviation amount of the azimuth error as a result of the vehicle velocity error Ve of the own vehicle 40 increases. Specifically, as shown in FIG. 3, the deviation amount of the azimuth error as a result of the vehicle velocity error Ve increases as the relative velocity becomes farther from zero. Therefore, weight wk may be set to be smaller as the estimated azimuth θok becomes closer to that at which the relative velocity Vok of the object becomes farther from zero.

In addition, the weighting unit 33 may set the weight to be greater as the estimated azimuth θok of the object becomes closer to a normal direction that is orthogonal to a traveling direction of the own vehicle 40. As shown in FIG. 3, an azimuth (an azimuth that is ±90+θr [deg]) that is the normal direction that is orthogonal to the traveling direction of the own vehicle 40 is an azimuth at which the deviation amount of the velocity-azimuth curve C that is attributed to the vehicle velocity error Ve is smallest. Because the deviation amount of the velocity-azimuth curve C decreases as the value of θok becomes closer to an azimuth that is the normal direction that is orthogonal to the traveling direction of the own vehicle 40, the weight wk that is supplied is preferably increased.

Specifically, for example, when 0≤θok<θr, the weighting unit 33 may decrease the weight wk as θok increases; when θr<θok<90+θr, the weighting unit 33 may increase the weight wk as θok increases; and when 90+θr≤θok≤180, the weighting unit 33 may decrease the weight wk as θok increases (unit is [deg] in each case). Here, the weight wk may be changed in steps or may be continuously changed relative to the estimated azimuth θok. The weight wk may be determined in advance based on simulations, experiments, and the like in which the vehicle velocity error Ve is changed, and stored in the RAM of the signal processing unit 20 as a map or a mathematical expression that corresponds to the estimated azimuth θok.

The correction value calculating unit 34 calculates the mounting angle deviation θd by calculating a weighted average value of the azimuth error (θik−θok) to which the weight wk is supplied by the weighting unit 33. Then, based on the mounting angle deviation θd, an azimuth correction value θa that is a correction value of the azimuth θo that is the azimuth of the object estimated by the azimuth estimating unit 23 is calculated.

Figure 4:
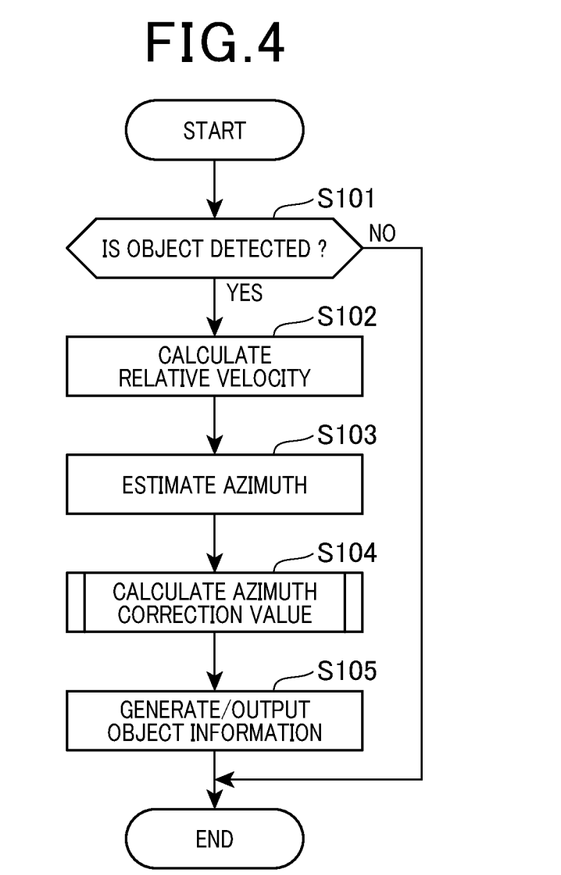
FIG. 4 is a flowchart illustrating an object detection process.

Next, an object detection process that is a main process performed by the CPU of the signal processing unit 20 will be described with reference to a flowchart in FIG. 4. The signal processing unit 20 periodically performs the object detection process shown in FIG. 4 at every measurement cycle in which the radar wave is transmitted and received.

First, at step S101, whether an object is detected is determined. Specifically, sampling data of beat signals that amount to a single measurement cycle that is acquired by the transmitting/receiving unit 12 transmitting and receiving the radar wave is acquired, and whether an object that reflects the radar wave is present is determined. Here, in the single measurement cycle, sampling data that is related to all transmission frequencies of the multifrequency CW is included. When determined that an object is detected at step S101, the signal processing unit 20 proceeds to step S102. When determined that an object is not detected, the signal processing unit 20 ends the process.

At step S102, the relative velocity Vok of the detected object to the own vehicle 40 is calculated for each observation point. Specifically, a frequency spectrum is calculated for each transmission frequency of the multifrequency CW and for each antenna that configures the antenna unit 11 by frequency analysis being performed on the acquired sampling data. A frequency bin of the frequency spectrum acquired as a result indicates the relative velocity relative to the object that reflects the radar wave. Here, fast Fourier transform (FFT) may be used as the frequency analysis. Furthermore, regarding the N number of observation points a total average value Vo of the relative velocity Vok is calculated. After step S102, the signal processing unit 20 proceeds to step S103.

At step S103, the azimuth θok of the detected object relative to the own vehicle 40 is estimated for each observation point. Specifically, based on the frequency spectrum determined at step S102, an average frequency spectrum is calculated for each antenna. Then, from the average frequency spectrum, a frequency bin in which a peak value at which reception strength is equal to or greater than a threshold that is set in advance is detected is extracted. An azimuth estimation process is performed for each frequency bin. Here, for the azimuth estimation process, a high-resolution estimation process such as multiple signal classification (MUSIC) is preferably used. However, beam forming or the like may also be used. Furthermore, regarding the N number of observation points, a total average value θo of the estimated azimuth θok is calculated. After step S103, the signal processing unit 20 proceeds to step S104.

At step S104, the azimuth θo that is estimated at step S103 is corrected and the azimuth correction value θa is calculated. Specifically, the azimuth correction value θa is calculated by an azimuth correction value calculation process shown in FIG. 5 being performed.

Figure 5:
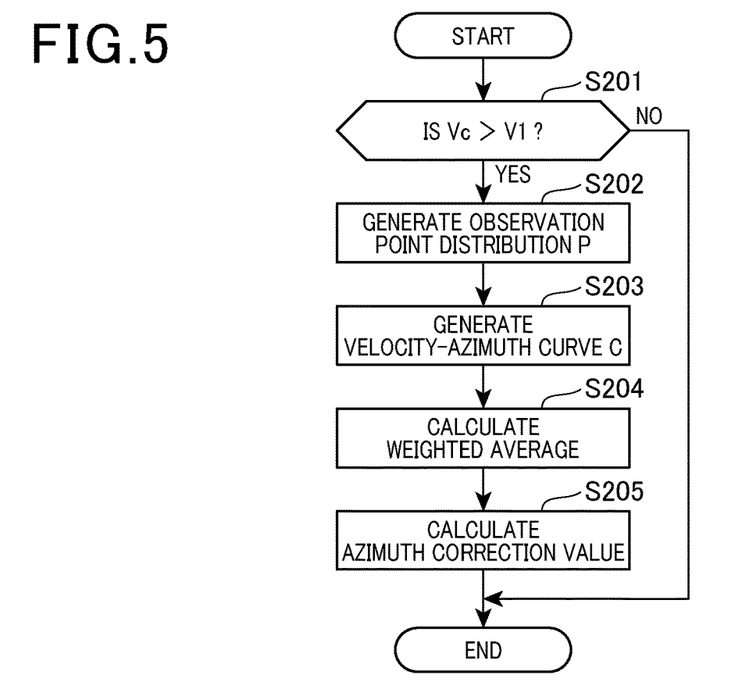
FIG. 5 is a flowchart illustrating an azimuth correction value calculation process.

In the azimuth correction value calculation process shown in FIG. 5, first, at step S201, the vehicle velocity Vc of the own vehicle 40 is acquired over the onboard LAN, and whether Vc exceeds a predetermined vehicle velocity threshold V1 is determined. The vehicle velocity threshold V1 is set to a value at which the velocity-azimuth curve C (see FIG. 3) that indicates the relationship between the relative velocity Vo of the object and an observation azimuth θo has a sufficiently large slope. When Vc>V1, the signal processing unit 20 proceeds to step S202. When Vc≤V1 is determined, the signal processing unit 20 ends the process and proceeds to step S105 shown in FIG. 4.

At step S202, the observation point distribution P that is a distribution of two-dimensional data that is composed of the relative velocity Vok and the estimated azimuth θok calculated at step S102 and S103 is generated. Subsequently, the signal processing unit 20 proceeds to step S203.

At step S203, the velocity-azimuth curve C is calculated based on expression (2) above that is also shown in FIG. 2. The velocity-azimuth curve C is a curve that is calculated based on the theoretical mounting angle θb of the object detection apparatus 10 and indicates the relationship between the relative velocity of the object and the azimuth of the object. Subsequently, the signal processing unit 20 proceeds to step S204.

At step S204, the weight wk is supplied based on the estimated azimuth θok. The weight wk is supplied such that the weight increases as the deviation amount of the azimuth error as a result of the vehicle velocity error Ve of the own vehicle 40 decreases. Then, based on expression (3) below that is also shown in FIG. 6, θdw that is a weighted average value is calculated.

$$\theta dw = \frac{\sum_{k=0}^{N}((\theta ik - \theta ok) * Wk)}{\sum_{k=0}^{N} Wk} \quad (3)$$

Figure 6:
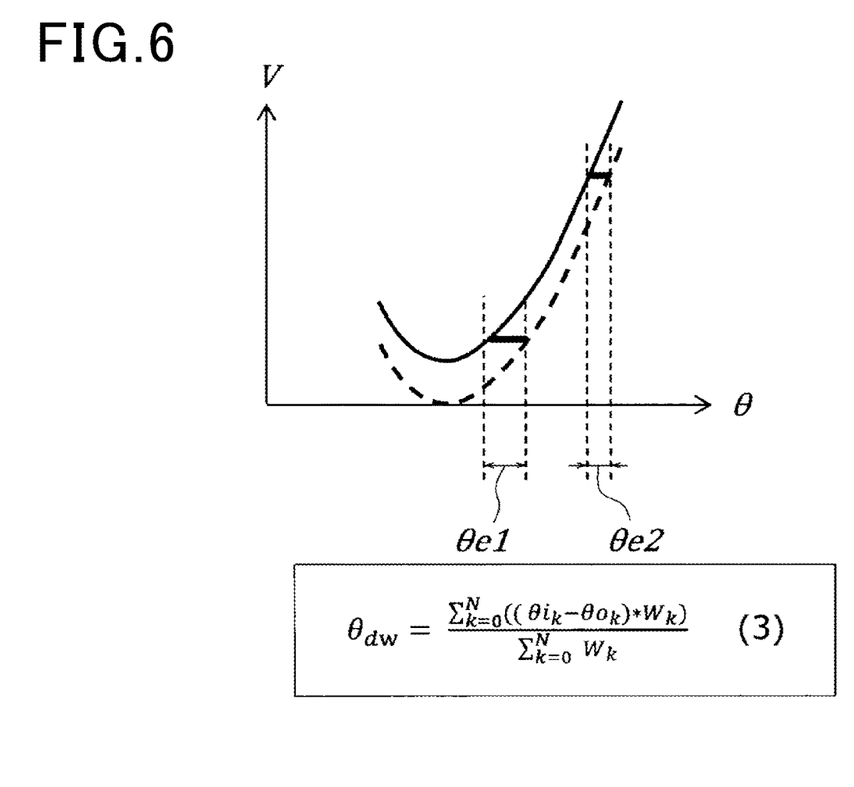
FIG. 6 is a diagram for explaining weighting based on azimuth.

A broken line in FIG. 6 indicates the velocity-azimuth curve when a vehicle velocity error is not present. A solid line indicates the velocity-azimuth curve when a vehicle velocity error is present. In FIG. 6, the vehicle velocity error is expressed by a difference in a velocity axis (V axis) direction between the two velocity-azimuth curves. In addition, the azimuth error is expressed by a difference in an azimuth axis (θ axis) direction between the two velocity-azimuth curves.

The deviation amount of the azimuth error that is attributed to the vehicle velocity error changes based on θ. For example, a deviation amount θe1 of the azimuth error may be greater than a deviation amount θe2 of the azimuth error (θe1>θe2). In this case, a value of the weight that is supplied is increased as the deviation amount of the azimuth error decreases. The value of the weight that is supplied is decreased as the deviation amount of the azimuth error increases.

As a result of weight being supplied in this manner, a degree of contribution of the observation point at which the deviation amount of the azimuth error is large can be decreased, and the degree of contribution of the observation point at which the deviation amount of the azimuth error is small can be increased. In the RAM of the signal processing unit 20, the weight wk that is set based on the deviation amount of the azimuth error as described above is stored in as a map in correspondence to the estimated azimuth θok. The weight wk is read from the map based on the estimated azimuth θok that is estimated at step S103. Subsequently, the signal processing unit 20 proceeds to step S205.

At step S205, the azimuth correction amount θa is calculated based on the weighted average value θdw that is calculated at step S204. θdw is the mounting angle deviation θdw of the object detection apparatus 10 that is calculated with the weight wk being supplied to the azimuth error (θik−θok) for each observation point. Specifically, the azimuth correction value θa can be calculated by θa=a cos (Vo/−Vc)+θdw. Subsequently, the signal processing unit 20 ends the process and proceeds to step S105 shown in FIG. 4.

At step S105, object information that includes at least the relative velocity Vo that is calculated at step S102 and the azimuth correction value θa that is calculated at step S205 is generated and outputted to each onboard apparatus over the onboard LAN. Subsequently, the process shown in FIG. 4 is ended.

As described above, according to the present embodiment, the weighted average value θdw is calculated by the weight wk being supplied based on the estimated azimuth θok. The weight wk is decreased as the deviation amount of the azimuth error (θik−θok) attributed to the vehicle velocity error Ve increases. In addition, the estimated azimuth is corrected by the azimuth correction value using the weighted average value θdw as the mounting angle deviation. Therefore, even when the vehicle velocity error Ve is present, the deviation in the mounting angle can be mitigated and the azimuth of the object can be accurately calculated. Because the deviation in the mounting angle that occurs as a result of the vehicle velocity error Ve can be mitigated without the vehicle velocity error Ve being actually measured, a new apparatus is not required to be added to the own vehicle 40 and the object detection apparatus 10. Therefore, the present disclosure can be applied to an existing object detection apparatus with relative ease.

According to the above-described embodiments, the following effects can be obtained.

The object detection apparatus 10 is mounted to the own vehicle 40 and detects an object by a reflected wave of a probe wave. The object detection apparatus 10 includes the velocity calculating unit 22 that calculates the relative velocity Vo of the object to the own vehicle 40, the azimuth estimating unit 23 that estimates the azimuth θ of the object relative to the own vehicle 40, and the azimuth correcting unit 30 that corrects the azimuth θo that is estimated by the azimuth estimating unit 23. The azimuth correcting unit 30 includes the velocity-azimuth curve generating unit 32, the weighting unit 33, and the correction value calculating unit 34.

For example, the velocity-azimuth curve generating unit 32 may generate the velocity-azimuth curve C that indicates the relationship between the relative velocity Vo of the object and the azimuth θi of the object that is calculated based on the theoretical mounting angle θb of the object detection apparatus 10 by expression (2) above that is also shown in FIG. 2. The weighting unit 33 supplies the weight wk to the azimuth error (θik−θok) that is the difference between the velocity-azimuth curve C and the estimated azimuth θok for each observation point, based on the estimated azimuth θok that is estimated by the azimuth estimating unit 23. The correction value calculating unit 34 calculates the weighted average value θdw of the azimuth error to which the weight wk is supplied by the weighting unit 33, based on expression (3) above that is also shown in FIG. 6. Then, the correction value of the estimated azimuth θik is calculated using the weighted average value θdw as the mounting angle deviation of the object detection apparatus 10.

As a result of the object detection apparatus 10, based on knowledge that the deviation amount that occurs in the velocity-azimuth curve C as a result of the vehicle velocity error Ve changes based on the estimated azimuth θok of the object relative to the own vehicle 40, the weighted average value θdw that is calculated by the azimuth error (θik−θok) being multiplied by the weight wk is calculated as the mounting angle of the object detection apparatus 10. Therefore, a calculation deviation in the mounting angle of the object detection apparatus 10 that is attributed to the vehicle velocity error Ve can be mitigated. In addition, because the azimuth correction value θa of the object is calculated using the mounting angle deviation θd, even when the vehicle velocity error Ve is present, the azimuth of the object can be accurately detected.

The weighting unit 33 may set the weight wk to be greater as the deviation amount of the azimuth error (θik−θok) as a result of the vehicle velocity error Ve that is an error in the vehicle velocity Vc of the own vehicle 40 decreases. Because the mounting angle deviation θdw can be calculated with a higher degree of contribution from the observation point at which the deviation amount of the azimuth error that occurs as a result of the vehicle velocity error Ve is small, the deviation in the mounting angle that occurs as a result of the vehicle velocity error Ve can be reduced.

The weighting unit 33 may set the weight wk to be greater as the estimated azimuth θok that is estimated by the azimuth estimating unit 23 becomes closer to the normal direction that is orthogonal to the traveling direction of the own vehicle 40. Because the mounting angle deviation θdw can be calculated with a higher degree of contribution of the observation point that corresponds to the estimated azimuth θok at which the deviation amount of the velocity-azimuth curve C that occurs as a result of the vehicle velocity error Ve is small, the deviation in the mounting angle that occurs as a result of the vehicle velocity error Ve can be reduced.

Here, according to the above-described embodiment, an case in which the antenna unit 11, the transmitting/receiving unit 12, and the signal processing unit 20 are integrated in the object detection apparatus 10 that is mounted to the bumper of the vehicle is described as an example. However, the present disclosure is not limited thereto. For example, the signal processing unit 20 may be configured inside an electronic control unit (ECU) of the own vehicle 40, and only the antenna unit 11 and the transmitting/receiving unit 12 may be mounted to the bumper of the vehicle. In addition, when an imaging apparatus, a global navigation satellite system (GNSS) reception apparatus, or the like is mounted to the own vehicle 40, the signal processing unit 20 may be configured to be capable of using data that is acquired from these apparatuses for object detection, vehicle velocity detection, and the like.

The control unit and the method thereof described in the present disclosure may be implemented by a dedicated computer that is provided so as to be configured by a processor and a memory, the processor being programmed to provide one or a plurality of functions that are implemented by a computer program. Alternatively, the control unit and the method thereof described in the present disclosure may be actualized by a dedicated computer that is provided by a processor being configured by a single dedicated hardware logic circuit or more. Still alternatively, the control unit and the method thereof described in the present disclosure may be implemented by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. An object detection apparatus that is mounted to a vehicle and detects an object by a reflected wave of a probe wave, the object detection apparatus comprising:
   a velocity calculating unit that calculates a relative velocity of the object to the vehicle;
   an azimuth estimating unit that estimates an azimuth of the object relative to the vehicle; and
   an azimuth correcting unit that corrects the azimuth of the object relative to the vehicle that is estimated by the azimuth estimating unit, wherein:
   the azimuth correcting unit includes
      a velocity-azimuth curve generating unit that generates a velocity-azimuth curve that indicates a relationship between the relative velocity of the object and the azimuth of the object that is calculated based on a theoretical mounting angle of the object detection apparatus,
      a weighting unit that supplies weight to an azimuth error that is an error between the velocity-azimuth curve and the estimated azimuth, based on the azimuth that is estimated by the azimuth estimating unit,
      a correction value calculating unit that calculates a correction value of the estimated azimuth by calculating, as an actual mounting angle deviation of the object detection apparatus, a weighted average value of the azimuth error to which the weight is supplied by the weighting unit; and
      the weighting unit increases the weight as a deviation amount of the azimuth error as a result of a vehicle velocity error that is an error in a vehicle velocity of the vehicle decreases.

2. The object detection apparatus according to claim 1, wherein:
   the weighting unit increases the weight as the estimated azimuth becomes closer to a normal direction that is orthogonal to a traveling direction of the vehicle.

3. An object detection apparatus that is mounted to a vehicle and detects an object by a reflected wave of a probe wave, the object detection apparatus comprising:
   a processor, wherein the processor is configured to:
      calculate a relative velocity of the object to the vehicle;
      estimate an azimuth of the object relative to the vehicle; and
      correct the estimated azimuth of the object relative to the vehicle,
      generate a velocity-azimuth curve that indicates a relationship between the relative velocity of the object and the azimuth of the object that is calculated based on a theoretical mounting angle of the object detection apparatus;
      add weight to an azimuth error that is an error between the velocity-azimuth curve and the estimated azimuth, based on the estimated azimuth;
      increase the weight as a deviation amount of the azimuth error as a result of a vehicle velocity error that is an error in a vehicle velocity of the vehicle decreases; and
      calculate a correction value of the estimated azimuth by calculating, as an actual mounting angle deviation of the object detection apparatus, a weighted average value of the azimuth error to which the weight is supplied.

4. The object detection apparatus according to claim 3, wherein:
   the processor is further configured to increase the weight as the estimated azimuth becomes closer to a normal direction that is orthogonal to a traveling direction of the vehicle.

* * * * *